United States Patent
Qin et al.

(10) Patent No.: US 11,904,918 B2
(45) Date of Patent: Feb. 20, 2024

(54) COMPUTER INTERLOCKING SYSTEM AND SWITCHING CONTROL METHOD FOR THE SAME, DEVICE, AND STORAGE MEDIUM

(71) Applicant: BYD COMPANY LIMITED, Shenzhen (CN)

(72) Inventors: Yejun Qin, Shenzhen (CN); Tao Yang, Shenzhen (CN); Faping Wang, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 756 days.

(21) Appl. No.: 17/050,808

(22) PCT Filed: Apr. 23, 2019

(86) PCT No.: PCT/CN2019/083927
§ 371 (c)(1),
(2) Date: Oct. 26, 2020

(87) PCT Pub. No.: WO2019/206146
PCT Pub. Date: Oct. 31, 2019

(65) Prior Publication Data
US 2021/0046958 A1    Feb. 18, 2021

(30) Foreign Application Priority Data

Apr. 27, 2018  (CN) .......................... 201810394913.4

(51) Int. Cl.
*B61L 3/00* (2006.01)
*G06F 11/20* (2006.01)
(Continued)

(52) U.S. Cl.
CPC .......... *B61L 3/006* (2013.01); *G06F 11/0796* (2013.01); *G06F 11/165* (2013.01);
(Continued)

(58) Field of Classification Search
CPC .... B61L 3/006; B61L 27/30; B61L 2019/065; B61L 19/06; B61L 15/0036;
(Continued)

(56) References Cited

U.S. PATENT DOCUMENTS 8,620,497 B2 * 12/2013 Ling ....................... B61L 19/06
701/19
2011/0288657 A1   11/2011  Morelli et al.

FOREIGN PATENT DOCUMENTS

| CN | 1803510 A | 7/2006 |
| CN | 101337552 A | 1/2009 |

(Continued)

OTHER PUBLICATIONS

Dai Shenghua and Li Yishi, "Research on 2-out-of-2 multiplying 2 redundancy system used in high-speed train," 2011 IEEE International Conference on Computer Science and Automation Engineering, Shanghai, China, 2011, pp. 483-486, doi: 10.1109/CSAE.2011.5952513. (Year: 2011).*

(Continued)

*Primary Examiner* — Farley Abad
(74) *Attorney, Agent, or Firm* — Wenye Tan (57) ABSTRACT

A computer interlocking system includes: a first sub-system and a second sub-system that have a same structure and function, where the first sub-system and the second sub-system form a double 2-vote-2 architecture, respectively including a main control layer, a network layer, and a communication and execution layer; the network layer being configured to construct a communication network of a sub-system in which the network layer is located; the main control layer and the communication and execution layer in the first sub-system being respectively connected to a communication network of the first sub-system; and the main control layer and the communication and execution layer in (Continued)

the second sub-system being respectively connected to a communication network of the second sub-system.

16 Claims, 7 Drawing Sheets

(51) Int. Cl.
*G06F 11/07* (2006.01)
*G06F 11/16* (2006.01)
*G06F 11/18* (2006.01)

(52) U.S. Cl.
CPC ........ *G06F 11/1633* (2013.01); *G06F 11/187* (2013.01); *G06F 11/2028* (2013.01)

(58) Field of Classification Search
CPC .. B61L 15/0081; B61L 27/70; G06F 11/0796; G06F 11/1633; G06F 11/165; G06F 11/187; G06F 11/2028; G06F 11/183; G06F 11/2005; G06F 11/2007; G06F 11/2025; G06F 11/2038; G06F 11/2097
See application file for complete search history.

(56) References Cited

FOREIGN PATENT DOCUMENTS

| | | |
|---|---|---|
| CN | 201932198 U | 8/2011 |
| CN | 102945221 A | 2/2013 |
| CN | 203287707 U | 11/2013 |
| CN | 105128895 A | 12/2015 |
| CN | 105388890 A | 3/2016 |
| CN | 106740999 A | 5/2017 |
| CN | 107272399 A | 10/2017 |
| CN | 107878506 A | 4/2018 |
| EP | 3699764 B1 * | 2/2022 .......... G06F 11/1608 |
| JP | 2017211792 A | 11/2017 |
| KR | 20170089209 A | 8/2017 |

OTHER PUBLICATIONS

Hongsheng Su, "Reliability and Security Analysis on 3-vote-2 Voting System", Jul. 2013 (Year: 2013).*
The World Intellectual Property Organization (WIPO) International Search Report for PCT/CN2019/083927 dated Jul. 25, 2019 7 Pages.

* cited by examiner

COMPUTER INTERLOCKING SYSTEM AND SWITCHING CONTROL METHOD FOR THE SAME, DEVICE, AND STORAGE MEDIUM

CROSS-REFERENCE TO RELATED APPLICATIONS

This application is a national phase entry under 35 U.S.C. § 371 of International Application No. PCT/CN2019/083927, filed on Apr. 23, 2019, which claims priority to Chinese Patent Application No 201810394913.4 filed by the BYD Co., Ltd. on Apr. 27, 2018, and entitled COMPUTER INTERLOCKING SYSTEM AND SWITCHING CONTROL METHOD FOR THE SAME, DEVICE, AND STORAGE MEDIUM, the entire content of all of which is incorporated herein by reference in its entirety.

FIELD

The present disclosure relates to the technical field of rail transit control and, in particular, to a computer interlocking system and a switching control method for the same, a device, and a storage medium.

BACKGROUND

In order to ensure the availability of a computer interlocking system, the computer interlocking system is usually set to a double 2-vote-2 architecture. The double 2-vote-2 architecture consists of two redundant systems. Each of the systems has a main control module thereof, logical operation module, input/output module, and the like. One of the systems is an active system, and the other of the systems is a standby system. A function module in each of the systems is composed of two independent central processing units (CPU), which forms a 2-out-of-2 voting mechanism, to implement a fail-safe input/output operation of the module.

In the related art, the computer interlocking system of rail transit mostly monitors and controls each module of the computer interlocking system through a control bus and a monitoring bus based on a safety computer platform. In order to ensure the reliability of the system and reduce a frequency of switching between the active system and the standby system in the computer interlocking system, in the current computer interlocking system, the control bus is usually arranged redundantly, which will increase the complexity of wiring and is not conducive to networking control.

SUMMARY

The present disclosure provides a computer interlocking system and a switching control method for the same, a device, and a storage medium, to simplify a control network of the system, and reduce wiring difficulty, which facilitates centralized control of a network bus, thereby resolving the technical problem of the great wiring difficulty in the prior art.

An embodiment of a first aspect of the present disclosure proposes a computer interlocking system, including: a first sub-system and a second sub-system that are mutually redundant and that have a same structure and function, where the first sub-system and the second sub-system form a double 2-vote-2 architecture, respectively including a main control layer, a network layer, and a communication and execution layer; the network layer being configured to construct a communication network of a sub-system in which the network layer is located; the main control layer and the communication and execution layer in the first sub-system being respectively connected to a communication network of the first sub-system; and the main control layer and the communication and execution layer in the second sub-system being respectively connected to a communication network of the second sub-system.

According to the computer interlocking system of the embodiment of the present disclosure, the first sub-system and the second sub-system that have the same structure and function are redundantly disposed, respectively including the main control layer, the network layer, and the communication and execution layer. The communication network of the sub-system is constructed through the network layer, the main control layer and the communication and execution layer of the first sub-system are respectively connected to the communication network of the first sub-system, and the main control layer and the communication and execution layer of the second sub-system are respectively connected to the communication network of the second sub-system. Therefore, the network layer is disposed to construct the communication network of the sub-system, which facilitates centralized control of the network bus in the system, thereby simplifying the control network of the system and reducing the difficulty of wiring.

An embodiment of a second aspect of the present disclosure proposes a switching control method for a computer interlocking system, the method including:

determining, by a communication and execution layer in a first sub-system, first sub-data acquired by a first CPU and second sub-data acquired by a second CPU;

performing, by the communication and execution layer in the first sub-system, 2-out-of-2 comparison on the first sub-data and the second sub-data, to determine whether the communication and execution layer in the first sub-system meets an active/standby switching condition; and controlling, when it is determined that the communication and execution layer in the first sub-system meets the active/standby switching condition, the communication and execution layer in the first sub-system to perform an active/standby switching operation.

According to the switching control method for the computer interlocking system of the embodiment of the present disclosure, the first sub-data acquired by the first CPU and the second sub-data acquired by the second CPU are determined through the communication and execution layer in the first sub-system, the 2-out-of-2 comparison is performed on the first sub-data and the second sub-data to determine whether the communication and execution layer in the first sub-system meets the active/standby switching condition, and the communication and execution layer in the first sub-system is controlled to perform the active/standby switching operation when meeting the active/standby switching condition. As a result, the 2-out-of-2 comparison is performed on the acquired data to determine whether to perform active/standby switching on a function module, which implements independent switching of each function module in the computer interlocking system, reduces calculation load of the main control module, and improves the reliability of the computer interlocking system.

An embodiment of a third aspect of the present disclosure provides a computer device, including a memory, a processor, and a computer program stored on the memory and executable on the processor, when the processor executes the computer program, the switching control method for the computer interlocking system according to the embodiment of the second aspect being implemented.

An embodiment of a fourth aspect of this application further provides a non-transitory computer readable storage medium storing a computer program, the program, when executed by a processor, implementing the switching control method for the computer interlocking system according to the embodiment of the second aspect.

Other aspects and advantages of the present disclosure will be given in the following description, some of which will become apparent from the following description or may be learned from practices of the present disclosure.

BRIEF DESCRIPTION OF THE DRAWINGS

The accompanying drawings are provided to further understand the present disclosure, and they constitute a part of the specification. The accompanying drawings, along with the specific implementations, are used to explain the present disclosure, and pose no limitation on the present disclosure. In the accompanying drawings.

DETAILED DESCRIPTION

The following describes embodiments of the present disclosure in detail. Exemplary embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as a limitation to the present disclosure.

A computer interlocking system and a switching control method for the same, a device, and a storage medium of the embodiments of the present disclosure are described below with reference to the accompanying drawings.

Figure 1:
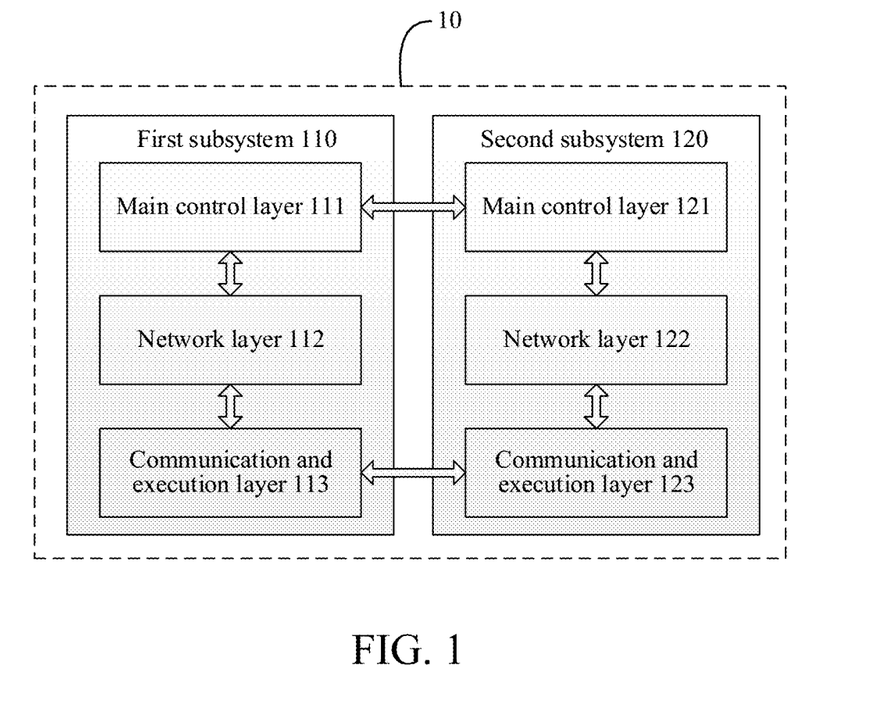
FIG. 1 is a schematic structural diagram of a computer interlocking system according to an embodiment of the present disclosure.

FIG. 1 is a schematic structural diagram of a computer interlocking system according to an embodiment of the present disclosure.

As shown in FIG. 1, a computer interlocking system 10 includes: a first sub-system 110 and a second sub-system 120 that are mutually redundant and that have a same structure and function.

The first sub-system 110 and the second sub-system 120 form a double 2-vote-2 architecture. The first sub-system 110 includes a main control layer 111, a network layer 112, and a communication and execution layer 113. The second sub-system 120 includes a main control layer 121, a network layer 122, and a communication and execution layer 123. Both the communication and execution layer 113 and the communication and execution layer 123 may include function modules such as a safety output module, a safety input module, and a signal module. The network layer 112 is configured to build a communication network of the first sub-system 110, and the network layer 122 is configured to build a communication network of the second sub-system 120. The main control layer 111 and the communication and execution layer 113 are respectively connected to the communication network in the first sub-system 110, and the main control layer 121 and the communication and execution layer 123 are respectively connected to the communication network in the second sub-system 120.

In one embodiment, the communication and execution layer 113 in the first sub-system 110 is in communication connection to the communication and execution layer 123 in the second sub-system 120, so that the communication and execution layer 113 and the communication and execution layer 123 can directly acquire states of each other and further determine, according to the acquired states, whether it is necessary to switch the function modules.

For example, when the first sub-system 110 is an active system, if the communication and execution layer 113 is incapable of acquiring data from the communication and execution layer 123 or acquires fault processing data output by the communication and execution layer 123, it may be determined that the communication and execution layer 123 fails. In this case, it is determined that the function modules are not to be switched. However, if the communication and execution layer 113 cannot send data normally, it is determined that the function module switching is required.

The communication and execution layers of the two systems in the computer interlocking system can independently determine a data processing mode according to the consistency of data through data interaction, thereby ensuring the consistency and reliability of the output data, implementing the fault-safe processing function of the communication and execution layer, and improving the reliability of the computer interlocking system.

In an embodiment of the present disclosure, the network layer 112 in the first sub-system 110 and/or the network layer 122 in the second sub-system 120 are further configured to construct a monitoring network. In this case, the main control layer 111 and the communication and execution layer 113 in the first sub-system 110 and/or the main control layer 121 and the communication and execution layer 123 in the second sub-system 120 are further connected to the monitoring network, respectively. For example, when the network layer 122 in the second sub-system 120 constructs a monitoring network, the main control layer 121 and the communication and execution layer 123 in the second sub-system 120 are connected to the monitoring network. When both the network layer 112 in the first sub-system 110 and the network layer 122 in the second sub-system 120 construct a monitoring network, the main control layer 111 and the communication and execution layer 113 in the first sub-system 110 are connected to the monitoring network constructed by the network layer 112, and the main control layer 121 and the communication and execution layer 123 in the second sub-system 120 are connected to the monitoring network constructed by the network layer 122.

It should be noted herein that in FIG. 1, the connection to the communication network and/or the monitoring network constructed by the network layer 112 is represented by the connection of the main control layer 111 and the communication and execution layer 113 to the network layer 112, and the connection to the communication network and/or the monitoring network constructed by the network layer 122 is represented by the connection of the main control layer 121 and the communication and execution layer 123 to the network layer 122.

According to the computer interlocking system of one embodiment, the first sub-system and the second sub-system that have the same structure and function are redundantly disposed, respectively including the main control layer, the network layer, and the communication and execution layer. The communication network of the sub-system is constructed through the network layer, the main control layer and the communication and execution layer of the first sub-system are respectively connected to the communication network of the first sub-system, and the main control layer and the communication and execution layer of the second sub-system are respectively connected to the communication network of the second sub-system. Therefore, the network layer is disposed to construct the communication network of the sub-system, which facilitates centralized control of the network bus in the system, thereby simplifying the control network of the system and reducing the difficulty of wiring.

Figure 2:
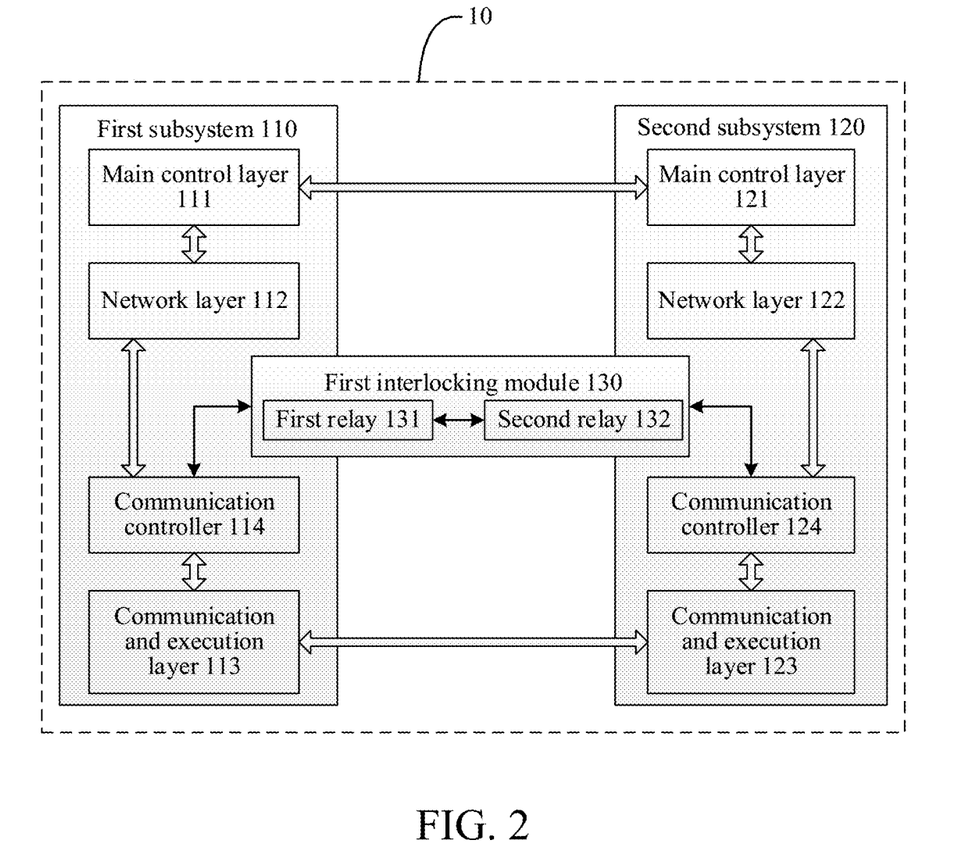
FIG. 2 is a schematic structural diagram of another computer interlocking system according to an embodiment of the present disclosure.

In one embodiment of the present disclosure, as shown in FIG. 2, on the basis of FIG. 1, the first sub-system 110 may further include N communication controllers 114, and the second sub-system 120 may further include N communication controllers 124, where N is a positive integer.

In one embodiment, the N communication controllers 114 are connected to the communication network and the communication and execution layer 113 of the first sub-system 110, and the N communication controllers 124 are connected to the communication network and the communication and execution layer 123 of the second sub-system 120. As shown in FIG. 2, the connection between the N communication controllers 114 and the communication network of the first sub-system 110 is implemented through the connection between the N communication controllers 114 and the network layer 112 of the first sub-system 110. Correspondingly, the connection between the N communication controllers 124 and the communication network of the second sub-system 120 is implemented through the connection between the N communication controllers 124 and the network layer 122 of the second sub-system 120.

In an embodiment of the present disclosure, the number N of communication controllers 114 in the first sub-system 110 is a positive integer greater than 1, that is, the first sub-system 110 includes at least two communication controllers 114.

The N communication controllers 114 are disposed in different positions. For example, the N communication controllers 114 may be disposed at different trackside signal devices, where different trackside signal devices may be the same type of trackside signal device, or may be different types of trackside signal devices. Alternatively, one or more of the N communication controllers may be disposed near the main control layer 111, and the remaining communication controllers 114 are disposed near the trackside signal device.

The communication and execution layer and the network layer are connected through the communication controller, so that the communication controller may be disposed in different positions according to a position of a controlled signal device, to provide a condition for flexible and centralized control of the controlled signal device.

It should be noted herein that, in FIG. 2, only the first sub-system 110 and the second sub-system 120 respectively include one communication controller, which is used as an example to explain the present disclosure, but not as a limitation to the present disclosure.

In one embodiment, the communication controller is disposed, so that the disposing position of the communication controller may be determined according to the distribution of the trackside signal device, and the communication controller implements distributed control of the trackside signal device by the main control layer, to simplify the wiring in the active/standby system in the interlocking system and facilitate the networking control. For example, assuming that there are ten trackside signal devices, positions of four trackside signal devices are relatively concentrated, and positions of other six trackside signal devices are relatively concentrated, two communication controllers may be disposed. One communication controller is responsible for data collection and control of the four trackside signal devices, and the other communication controller is responsible for data collection and control of the other six trackside signal devices. The signal devices that are placed in a more concentrated manner are connected by disposing communication controllers, so that centralized control of an area can be implemented.

Further, in order to implement initiative switching of the communication controller, in a possible implementation of the embodiment of the present disclosure, as shown in FIG. 2, the computer interlocking system 10 may further include: a first interlocking module 130 respectively connected to a communication controller 114 in the first sub-system 110 and a communication controller 124 in the second sub-system 120.

The first interlocking module 130 is configured to determine an active/standby relationship between the communication controller 114 in the first sub-system 110 and the communication controller 124 in the second sub-system 120 according to an acquired instruction of the communication controller 114 in the first sub-system 110 or an acquired instruction of the communication controller 124 in the second sub-system 120.

As shown in FIG. 2, the first interlocking module 130 includes: a first relay 131 and a second relay 132 connected to each other in an interlocking manner.

In one embodiment, the first interlocking module 130 is composed of the first relay 131 and the second relay 132. The first relay 131 and the second relay 132 form interlocking logic to determine the active/standby relationship between the communication controller 114 and the communication controller 124.

According to the disclosed computer interlocking system, the first interlocking module is disposed to connect the communication controller in the first sub-system and the communication controller in the second sub-system, so that the communication controllers in different sub-systems can autonomously perform active/standby switching without switching control by a main control module, so that the operation burden of the main control module can be effectively reduced.

In an embodiment of the present disclosure, the main control layer 111 and the communication and execution layer 113 in the first sub-system 110 are respectively in communication connection to the main control layer 121 and the communication and execution layer 123 in the second sub-system 120.

Figure 3:
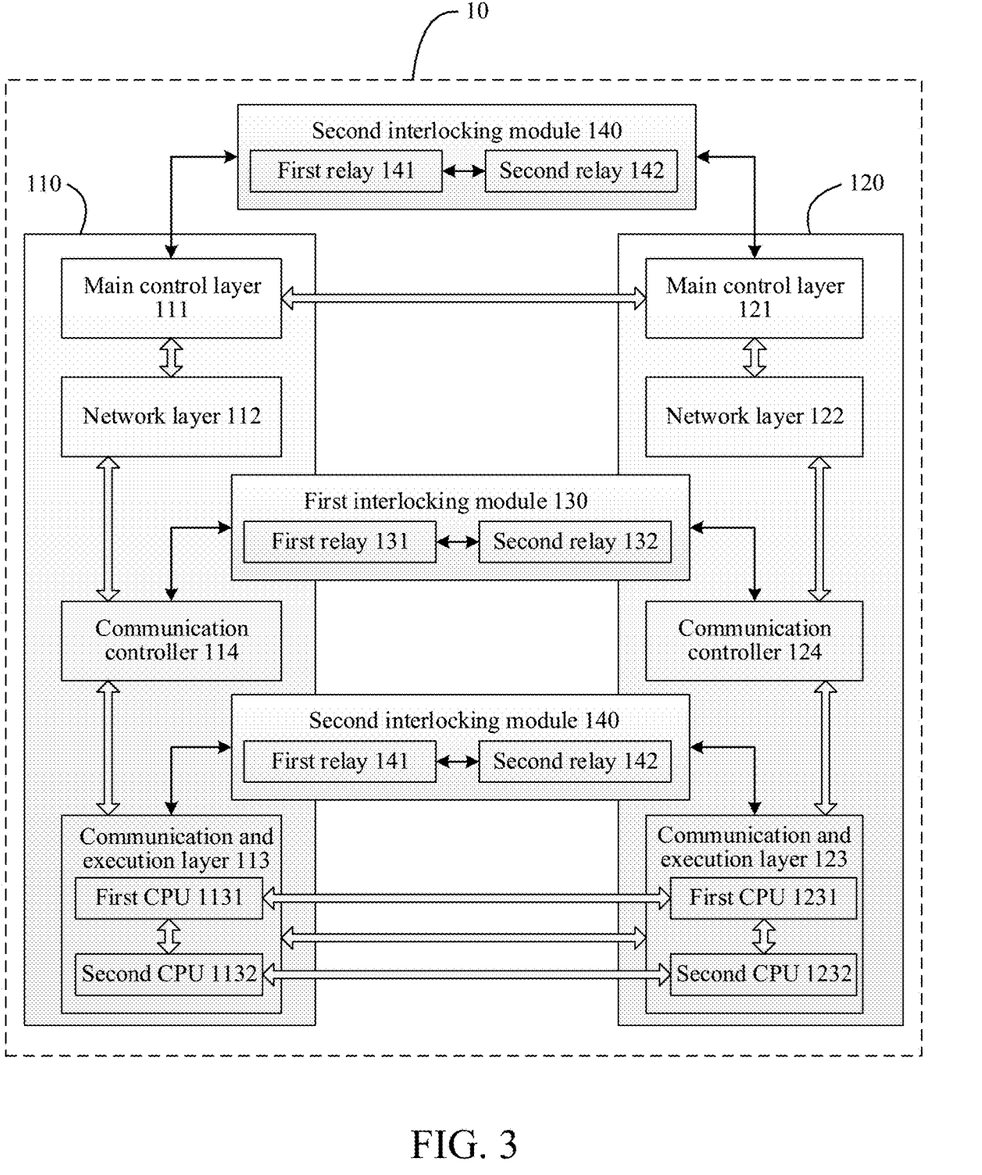
FIG. 3 is a schematic structural diagram of still another computer interlocking system according to an embodiment of the present disclosure.

FIG. 3 is a schematic structural diagram of still another computer interlocking system according to an embodiment of the present disclosure. As shown in FIG. 3, on the basis of FIG. 1, the computer interlocking system 10 may further include: second interlocking modules 140 disposed between the main control layer 111 and the communication and execution layer 113 in the first sub-system 110 and the main control layer 121 and the communication and execution layer 123 in the second sub-system 120, respectively.

The second interlocking module 140 is configured to determine an active/standby relationship between the first sub-system 110 and the second sub-system 120 according to an acquired instruction of the first sub-system 110 or an acquired instruction of the second sub-system 120.

As shown in FIG. 3, a second interlocking module 140 is disposed between the main control layer 111 in the first sub-system 110 and the main control layer 121 in the second sub-system 120, and a second interlocking module 140 is disposed between the communication and execution layer 113 in the first sub-system 110 and the communication and execution layer 123 in the second sub-system 120. The second interlocking module 140 includes a first relay 141 and a second relay 142 connected to each other, interlocking logic being formed by using the first relay 141 and the second relay 142, to determine the active/standby relationship between the first sub-system 110 and the second sub-system 120.

Further, in an embodiment of the present disclosure, as shown in FIG. 3, the communication and execution layer 113 and the communication and execution layer 123 include two central processing units (CPU) with the same performance. A first CPU 1131 in the first sub-system 110 is communicatively connected to a first CPU 1231 in the second sub-system 120, and a second CPU 1132 in the first sub-system 110 is communicatively connected to a second CPU 1232 in the second sub-system 120.

In one embodiment, the communication and execution layer 113 and the communication and execution layer 123 are configured to: perform 2-out-of-2 comparison on data acquired by the two CPUs, and output the data acquired by the two CPUs when it is determined that state data acquired by the two CPUs is consistent; and enable fault processing logic when it is determined that the state data generated by the two CPUs is inconsistent.

The data acquired by the two CPUs may be the state data of a signal device for detection, or may be control data delivered by the main control layer. The data output may be reporting the acquired data to the main control layer, or may be outputting the acquired data to a signal device in the lower layer, to control the signal device to perform the corresponding operation.

For example, the communication and execution layer 113 may receive the control data sent by the main control layer 111, and perform 2-out-of-2 comparison within the system when receiving the control data. When the control data received by the first CPU 1131 and the second CPU 1132 is consistent, the communication and execution layer 113 delivers the received control data to the signal device. When the control data received by the first CPU 1131 and the second CPU 1132 are inconsistent, the communication and execution layer 113 performs fail-safe processing and is switched to a safety side.

For another example, the communication and execution layer 113 collects operating state data of the lower signal device in real time, and perform 2-out-of-2 comparison within the system on the state data collected by the first CPU 1131 and the second CPU 1132. When the state data is compared to be consistent, the communication and execution layer 113 uploads the collected state data to the main control layer 111. When the state data is compared to be inconsistent, the communication and execution layer 113 performs fail-safe processing and is switched to the safety side.

The communication and execution layer performs 2-out-of-2 comparison on the acquired data, outputs the data only when the data is consistent, and enables the fault processing logic when the data is inconsistent, thereby implementing the fault-safe processing function, so that the reliability of the system can be improved while ensuring security.

According to the disclosed computer interlocking system, interlocking modules are disposed between the main control layer in the first sub-system and the main control layer in the second sub-system, and between the communication and execution layer in the first sub-system and the communication and execution layer in the second sub-system, respectively, to determine the active/standby relationship between the first sub-system and the second sub-system, so that independent switching of each layer can be implemented without affecting the active/standby relationship of other layers, thereby implementing the initiative of module switching.

Figure 4:
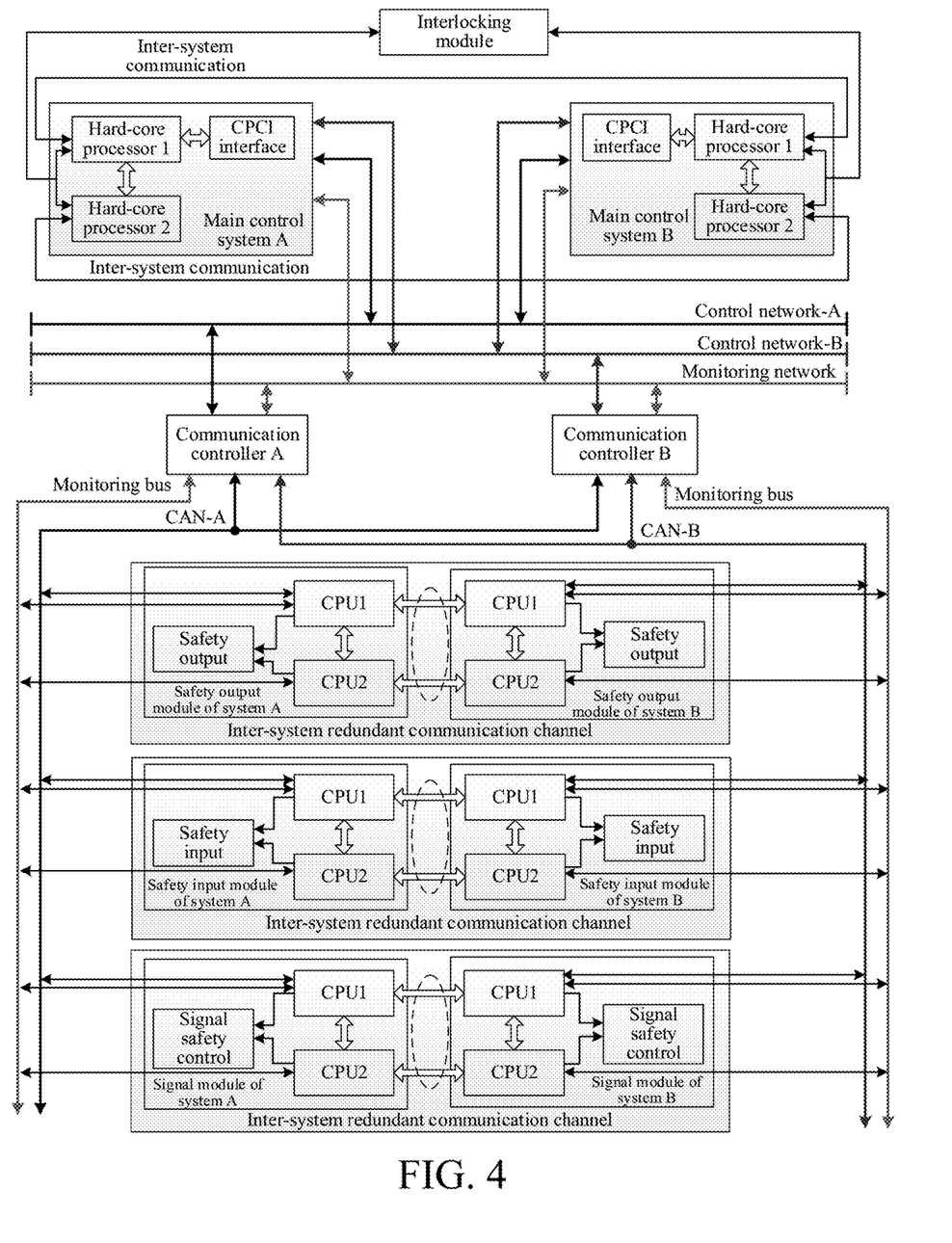
FIG. 4 is a schematic diagram of an architecture of a computer interlocking system according to a specific embodiment of the present disclosure.
Figure 5:
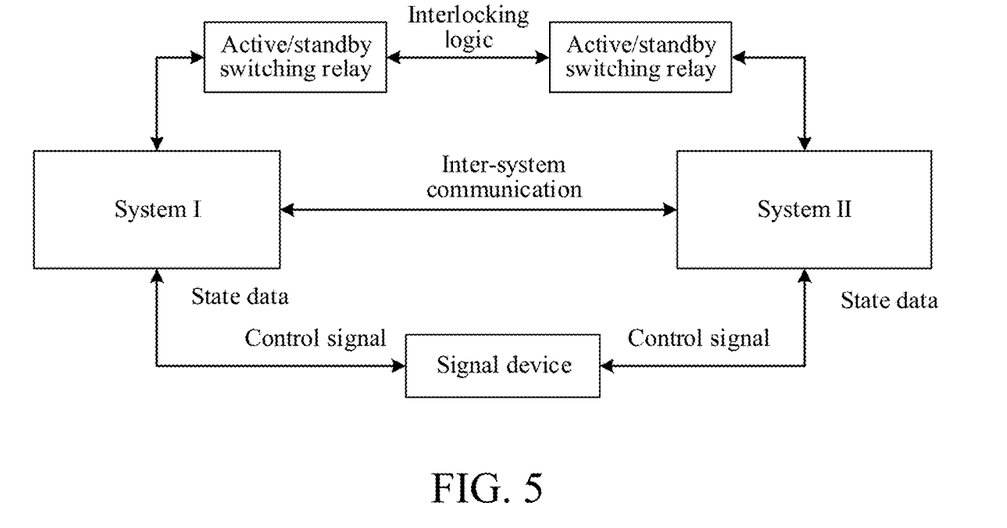
FIG. 5 is a schematic diagram of a function module using a double 2-vote-2 structure.

FIG. 4 is a schematic diagram of an architecture of a computer interlocking system according to a specific embodiment of the present disclosure. In FIG. 4, CAN-A is a controller area network (CAN) bus redundantly disposed for a system A, CAN-B is a control bus redundantly disposed for a system B, and a CPCI interface is an interface of a Compact Peripheral Component Interconnect (CPCI), which is a bus interface standard. As shown in FIG. 4, the computer interlocking system includes a system A and a system B. the system A and the system B have a same structure. In FIG. 4, a main control module, a safety output module, a safety input module, and a signal module are used as examples, and the structure of each function module is shown in FIG. 5. In the computer interlocking system shown in FIG. 4, a communication controller A and a communication controller B are disposed for the system A and the system B, respectively. The control bus CAN-A of the system A is connected to the communication controller A and the communication controller B, respectively, the control bus CAN-B of the system B is respectively connected to the communication controller A and the communication controller B, a monitoring bus of the system A is connected to the communication controller A, and a monitoring bus of the system B is connected to the communication controller B. The communication controller A is connected to a control network-A corresponding to the system A, and the communication controller B is connected to a control network-B corresponding to the system B, of which both are connected to the monitoring network. It may be learned from FIG. 4 that the monitoring buses and control buses of the system A and the system B are connected to the network through the corresponding communication controller A and communication controller B, respectively, and the wiring is simple, which facilitates centralized control. The safety output module, the safety input module, and the signal module of the system A are connected to the safety output module, the safety input module, and the signal module of the system B through an inter-system redundant communication channel, which can make each function module have independent switching function, so that the function modules are switched without requiring the main control module, thereby reducing the calculation burden of the main control module.

FIG. 5 is a schematic diagram of a function module using a double 2-vote-2 structure. As shown in FIG. 5, a system I and a system II redundantly disposed for the function module form an active/standby relationship. The system I and the system II are respectively connected to an active-standby switching relay, and interlock logic is formed between the two active-standby switching relays to determine the active-standby relationship of the system I and the system II. The active-standby switching relay is a safety relay meeting the EN50205 standard. The system I and the system II may collect state data from the lower signal device, and may also deliver a control signal to the signal device. Data exchange is performed between the system I and the system II through the inter-system communication interface. The communication between the two systems is performed by using a security communication protocol.

The working process of the function module with the double 2-vote-2 structure is as follows.

When the function module works normally, both the system I and the system II collect operating state data of the signal device, and the control signal is output by the active system or simultaneously output by both systems according to the control principle of the signal device. For example, for the signal module, the active system outputs the control signal. For a turnout module, an axle counter module, an emergency stop module, and a platform screen door module, the system I and the system II simultaneously output the control signal.

The principle of switching between the system I and the system II is bumpless switching. When a system fails, the failed system exits according to the safety control mechanism thereof without affecting the normal operation of the other system. When both systems fail, the function module stops outputting data, and the system is switched to the safety side. After the two systems are powered on and started, state data of contacts of the active/standby switching relay is collected to determine the active/standby relationship between the two systems.

The data output by the two systems is subject to the data output by the active system. The standby system periodically reconstructs and synchronizes data with the active system through inter-system communication, to maintain the consistency of the output data. When data synchronization fails, the standby system is determined to be in an asynchronous state, stops data output, and does not support system switching.

Corresponding to the computer interlocking system in the foregoing embodiment, the present disclosure further proposes a switching method for a computer interlocking system to control the computer interlocking system in the foregoing embodiment.

Figure 6:
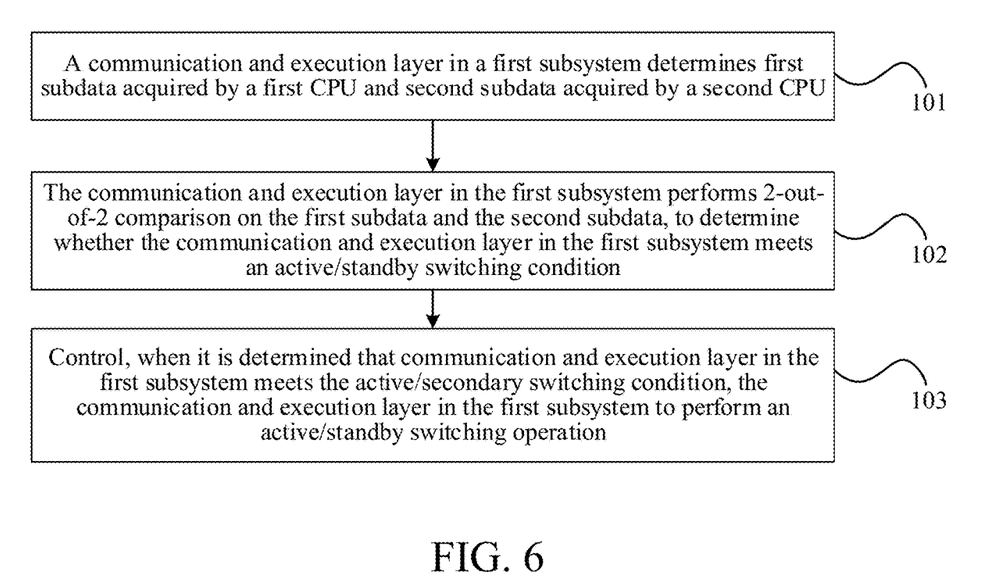
FIG. 6 is a schematic flowchart of a switching control method for a computer interlocking system according to an embodiment of the present disclosure.

FIG. 6 is a schematic flowchart of a switching control method for a computer interlocking system according to an embodiment of the present disclosure.

As shown in FIG. 6, the switching control method for a computer interlocking system may include the following steps.

Step 101: A communication and execution layer in a first sub-system determines first sub-data acquired by a first CPU and second sub-data acquired by a second CPU.

The first sub-system is any sub-system in the computer interlocking system in the foregoing embodiment, or a sub-system currently in an active state, which is not limited in one embodiment. The computer interlocking system further includes a second sub-system. The first sub-system and the second sub-system have the same structure and function. The communication and execution layers in the first sub-system and the second sub-system both include two CPUs.

In one embodiment, the communication and execution layer of the first sub-system has a double 2-vote-2 structure, and includes a first CPU and a second CPU. Both CPUs obtain data from a main control layer of the first sub-system, or collect data from a lower signal device. The data acquired by the first CPU is the first sub-data, and the data acquired by the second CPU is second sub-data.

The first sub-data and the second sub-data may be control signals acquired from the main control layer of the first sub-system, or may be state data collected from the signal device.

Step 102: The communication and execution layer in the first sub-system performs 2-out-of-2 comparison on the first sub-data and the second sub-data, to determine whether the communication and execution layer in the first sub-system meets an active/standby switching condition.

In one embodiment, after the communication and execution layer of the first sub-system obtains the first sub-data and the second sub-data, the 2-out-of-2 comparison may be performed on the first sub-data and the second sub-data, to determine, according to comparison results, whether the communication and execution layer in the first sub-system meets the active/standby switching condition.

For example, when the comparison results of the first sub-data and the second sub-data are consistent, it may be considered that the communication and execution layer of the first sub-system can work normally. In this case, it is determined that the communication and execution layer does not satisfy the active/standby switching condition. When the comparison results of the first sub-data and the second sub-data are inconsistent, it may be considered that the communication and execution layer of the first sub-system may fail. In this case, it is determined that the communication and execution layer satisfy the active/standby switching condition.

Step 103: Control, when it is determined that communication and execution layer in the first sub-system meets the active/standby switching condition, the communication and execution layer in the first sub-system to perform an active/standby switching operation.

In one embodiment, the communication and execution layer in the first sub-system may be controlled, when it is determined that the communication and execution layer in the first sub-system meets the active/standby switching condition, to perform the active/standby switching operation. For example, when the first sub-system is currently the active system and the second sub-system is the standby system, if it is determined that the communication and execution layer of the first sub-system needs to be switched, the communication and execution layer is switched to the second sub-system to keep working. However, the main control layer of the first sub-system remains the active state.

According to the disclosed switching control method for the computer interlocking system, the first sub-data acquired by the first CPU and the second sub-data acquired by the second CPU are determined through the communication and execution layer in the first sub-system, the 2-out-of-2 comparison is performed on the first sub-data and the second sub-data to determine whether the communication and execution layer in the first sub-system meets the active/standby switching condition, and the communication and execution layer in the first sub-system is controlled, when the communication and execution layer meets the active/standby switching condition, to perform the active/standby switching operation. As a result, the 2-out-of-2 comparison is performed on the acquired data to determine whether to perform active/standby switching on a function module, which implements independent switching of each function module in the computer interlocking system, reduces calculation load of the main control module, and improves the reliability of the computer interlocking system.

Figure 7:
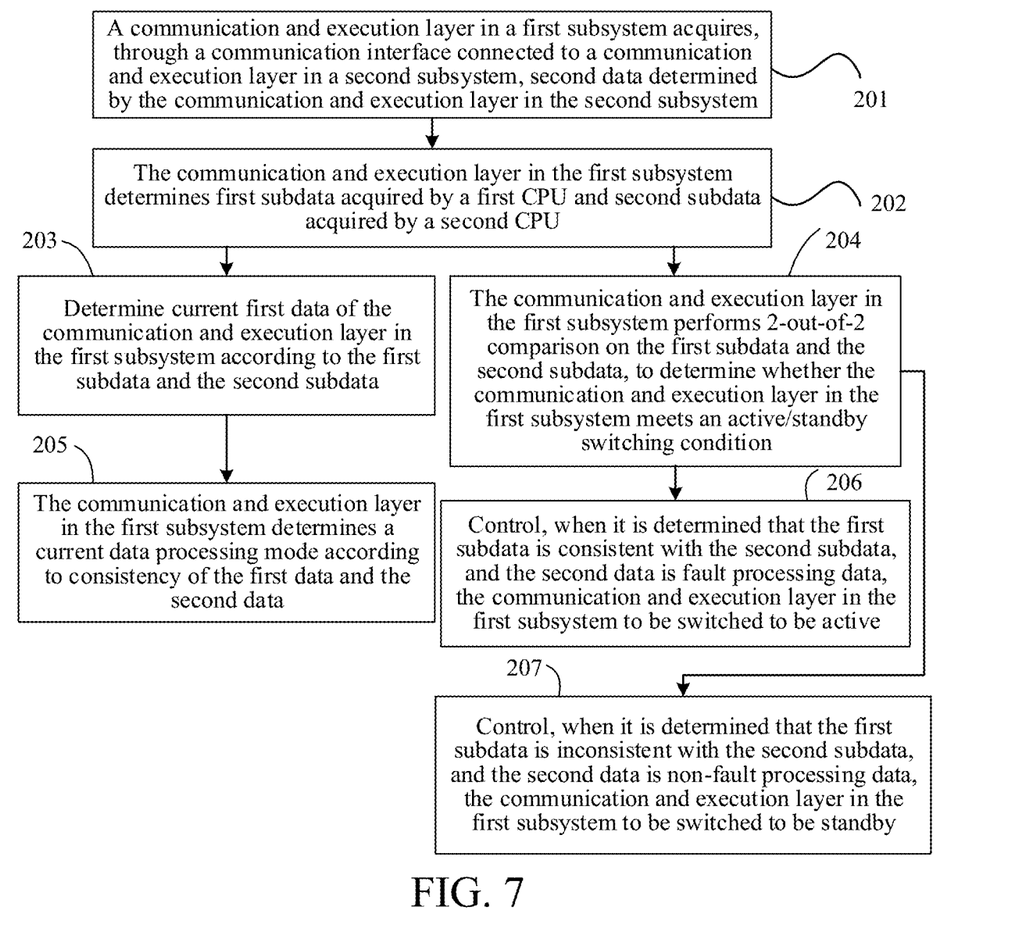
FIG. 7 is a schematic flowchart of another switching control method for a computer interlocking system according to an embodiment of the present disclosure.

In an embodiment of the present disclosure, in the communication and execution layer in the first sub-system, the first sub-data acquired by the first CPU and the second sub-data acquired by the second CPU may be further configured to determine a fault processing policy. The active/standby switching may further be determined in combination with the data acquired by the communication and execution layers in the second sub-system. Therefore, an embodiment of the present disclosure proposes another switching control method for a computer interlocking system. FIG. 7 is a schematic flowchart of another switching control method for a computer interlocking system according to an embodiment of the present disclosure.

As shown in FIG. 7, the switching control method for a computer interlocking system may further include the following steps.

Step 201: A communication and execution layer in a first sub-system acquires, through a communication interface connected to a communication and execution layer in a second sub-system, second data determined by the communication and execution layer in the second sub-system.

The second data may be a control signal acquired from a main control layer of the second sub-system, or state data collected from a signal device, or may be a fault processing policy.

In one embodiment, when the computer interlocking system is in operation, the communication and execution layers of the first sub-system and the second sub-system both obtain data from an upper main control layer or a lower signal device, and may determine the output according to the acquired data. Each layer in the first sub-system is communicatively connected to each layer in the second sub-system. Therefore, the communication and execution layer in the first sub-system may acquire, through a communication interface connected to the communication and execution layer in the second sub-system, determined second data from the communication and execution layer in the second sub-system.

It should be noted herein that since the first sub-system and the second sub-system have the same structure and function, the communication and execution layer of the second sub-system may determine the second data by using the same method as the communication and execution layer of the first sub-system. The implementation process of the first sub-system acquiring the first data is to be described in the subsequent content of the present disclosure, and the implementation process of the second sub-system acquiring the second data will not be described in detail herein.

It should be further noted that step 201 may be performed at any moment before steps 205 to 207 are performed. Step 201 is performed before step 202 to describe the present disclosure, for example, which does not constitute a limitation on the present disclosure.

Step 202: The communication and execution layer in the first sub-system determines first sub-data acquired by a first CPU and second sub-data acquired by a second CPU.

Step 203: Determine current first data of the communication and execution layer in the first sub-system according to the first sub-data and the second sub-data.

The first data may be a control signal acquired from a main control layer of the first sub-system, or state data collected from a signal device, or may be a fault processing policy.

In one embodiment, after the communication and execution layer of the first sub-system determines the first sub-data acquired by the first CPU and the second sub-data acquired by the second CPU, the current first data of the communication and execution layer in the first sub-system may be determined according to the first sub-data and the second sub-data. For example, 2-out-of-2 comparison may be performed on the first sub-data and the second sub-data, and the first data may be determined according to the comparison result.

Specifically, when the communication and execution layer of the first sub-system determines that the first sub-data is consistent with the second sub-data, the first sub-data is determined to be the first data, or the second sub-data may also be determined to be the first data. The first data is determined according to preset fault processing logic when it is determined that the first sub-data is inconsistent with the second sub-data.

Further, the determining the first data according to preset fault processing logic when the first sub-data is inconsistent with the second sub-data includes: first determining target fault processing logic according to a transmission direction of the first sub-data or a corresponding signal device type; and further determining the first data according to the target processing logic.

For example, different fault handling logic may be set for different data transmission directions (reported to the main control layer or delivered to the signal device). Therefore, in one embodiment, corresponding target fault processing logic may be determined according to the transmission direction of the first sub-data when the first sub-data is inconsistent with the second sub-data, and the first data is determined according to the target fault processing logic.

For another example, different fault handling logic may be set for different types of signal devices. When the first sub-data and the second sub-data are the data delivered to the lower signal device, the corresponding target fault processing logic may be determined according to the a signal device type corresponding to the first sub-data, and the first data is determined according to the target fault processing logic. The signal device is a signal, for example. Since the working logic of the signal is that only the active system outputs the control signal, the fault processing logic of the signal may be set as follows. When the data acquired by the two CPUs of the communication and execution layer of the active system is different, the fault processing logic is "outputting an inhibiting signal". When the data acquired by the two CPUs of the communication and execution layer of the standby system is different, the fault processing logic is "not processing". Furthermore, when the first sub-data is data to be delivered to the signal, and when the first sub-data and the second sub-data are inconsistent, it may be determined that the first data is an output inhibiting signal.

In an embodiment of the present disclosure, when the first sub-data is inconsistent with the second sub-data, after the first data is determined according to the preset fault processing logic, the failed active system or standby system may further exit according to a security control mechanism thereof without affecting the normal operation of the other system.

Step 204: The communication and execution layer in the first sub-system performs 2-out-of-2 comparison on the first sub-data and the second sub-data, to determine whether the communication and execution layer in the first sub-system meets an active/standby switching condition.

It should be noted herein that step 202 and step 203 may be performed sequentially or simultaneously. The present invention does not limit the execution order of step 202 and step 203.

Step 205: The communication and execution layer in the first sub-system determines a current data processing mode according to consistency of the first data and the second data.

In one embodiment, after the communication and execution layer of the first sub-system acquires the second data from the communication and execution layer of the second sub-system, the first data may be compared with the second data, and the current data processing mode is determined according to the consistency of the first data and the second data.

Specifically, the communication and execution layer in the first sub-system outputs the first data when the first data is consistent with the second data. The first data is updated according to a current active/standby relationship when the first data is inconsistent with the second data.

Further, the updating the first data according to a current active/standby relationship when the first data is inconsistent with the second data includes: controlling, when the first sub-system is the active system, the communication and execution layer in the second sub-system to update the second data according to the first data; and updating the first data according to the second data when the second sub-system is the active system.

For example, assuming that the current first sub-system is the active system and the second sub-system is the standby system, when the first data is consistent with the second data, the communication and execution layer of the first sub-system outputs the first data, and when the first data is inconsistent with the second data, the communication and execution layer of the second sub-system updates the second data to the first data.

Step 206: Control, when it is determined that the first sub-data is consistent with the second sub-data and the second data is fault processing data, the communication and execution layer in the first sub-system to be switched to be active.

In one embodiment, the communication and execution layer in the first sub-system may perform 2-out-of-2 comparison on the first sub-data and the second sub-data, to control active/standby switching of the communication and execution layer in the first sub-system according to the acquired second data.

The communication and execution layer in the first sub-system is controlled to be switched to be active when the communication and execution layer determines that the first sub-data is consistent with the second sub-data and the second data is fault processing data.

Specifically, if the communication and execution layer in the first sub-system is currently active, when the communication and execution layer of the first sub-system determines that the first sub-data is consistent with the second sub-data, and the second data is the fault processing data, the active state of the communication and execution layer in the first sub-system is maintained without active/standby switching. If the communication and execution layer in the first sub-system is currently standby, when the communication and execution layer in the first sub-system determines that the first sub-data is consistent with the second sub-data and the second data is the fault processing data, the communication and execution layer in the first sub-system is controlled to be switched to be active from the standby state.

Step 207: Control, when it is determined that the first sub-data is inconsistent with the second sub-data and the second data is non-fault processing data, the communication and execution layer in the first sub-system to be switched to be standby.

In one embodiment, the communication and execution layer in the first sub-system performs 2-out-of-2 comparison on the acquired first sub-data and second sub-data, the communication and execution layer in the first sub-system is controlled, when determining that the first sub-data is inconsistent with the second sub-data and the acquired second data is non-fault processing data, to be switched to be standby.

Specifically, if the communication and execution layer in the first sub-system is currently active, when the communication and execution layer in the first sub-system determines that the first sub-data is inconsistent with the second sub-data and the second data is the non-fault processing data, the communication and execution layer in the first sub-system is controlled to be switched to be standby from the active state. If the communication and execution layer in the first sub-system is currently standby, when the communication and execution layer of the first sub-system determines that the first sub-data is inconsistent with the second sub-data, and the second data is the non-fault processing data, the standby state of the communication and execution layer in the first sub-system is maintained without active/standby switching.

According to the disclosed switching control method for the computer interlocking system, the first data of the communication and execution layer in the first sub-system is determined according to the acquired first sub-data and second sub-data by acquiring the second data of the communication and execution layer in the second sub-system, and the current data processing mode is further determined according to the consistency of the first data and the second data. As a result, based on data interaction between the communication and execution layers in the computer interlocking system, the communication and execution layer can independently determine a data processing mode according to the consistency of data, thereby ensuring the consistency and reliability of the output data, implementing the fault-safe processing function of the communication and execution layer, and improving the reliability of the computer interlocking system. It is determined, by performing 2-out-of-2 comparison on the acquired first sub-data and second sub-data, whether the communication and execution layer in the first sub-system needs to perform active/standby switching. When it is determined that the first sub-data and the second sub-data is consistent and the second data is fault processing data, the communication and execution layer in the first sub-system is controlled to be switched to be active. When it is determined that the first sub-data and the second sub-data is inconsistent and the second data is non-fault processing data, the communication and execution layer in the first sub-system is controlled to be switched to be standby. In this way, the active/standby relationship of the function module in the computer interlocking system can be independently switched, reducing the calculation load of the main control module, and improving the reliability of the system while ensuring the security.

Figure 8:
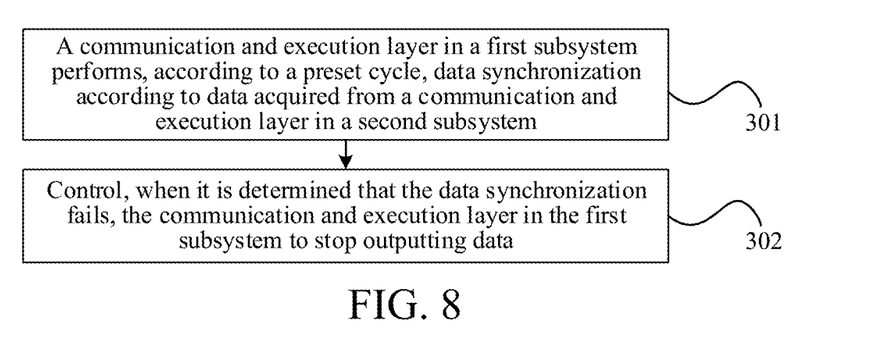
FIG. 8 is a schematic flowchart of still another switching control method for a computer interlocking system according to an embodiment of the present disclosure.

In the embodiment of the present disclosure, the first sub-system and the second sub-system may be switched between the active and standby states. The first sub-system may be the active system, or may be the standby system. When the first sub-system is the standby system, the first sub-system may synchronize data with the second sub-system to ensure the consistency of the output data. Therefore, an embodiment of the present disclosure proposes another switching control method for a computer interlocking system. As shown in FIG. 8, based on the foregoing embodiment, when the first sub-system is the standby system, the switching control method for a computer interlocking system may further include the following steps.

Step 301: A communication and execution layer in a first sub-system performs, according to a preset cycle, data synchronization according to data acquired from a communication and execution layer in a second sub-system.

Step 302: Control, when it is determined that the data synchronization fails, the communication and execution layer in the first sub-system to stop outputting data.

In the computer interlocking system in the foregoing embodiment, the output data of the communication and execution layer is subject to data output by the active system. When the first sub-system is the standby system, the second sub-system is the active system. To ensure the consistency of the output data, in one embodiment, the communication and execution layer of the first sub-system may periodically acquire data from the communication and execution layer of the second sub-system, and performs data synchronization based on the acquired data. When the data synchronization fails, the first sub-system is determined to be in an asynchronous state. In this case, the communication and execution layer in the first sub-system may be controlled to stop outputting data.

According to the switching control method for the computer interlocking system according to the embodiment of the present disclosure, when the first sub-system is the standby system, the communication and execution layer of the first sub-system performs data synchronization according to the data acquired from the communication and execution layer of the second sub-system, so that the consistency of the output data can be ensured. When the data is synchronously identified, the communication and execution layer of the first sub-system is controlled to stop outputting the data, so that it may be determined that the output data is subject to the data output by the active system, thereby ensuring the reliability of the output data.

In order to implement the foregoing embodiments, the present disclosure further proposes a computer device.

Figure 9:
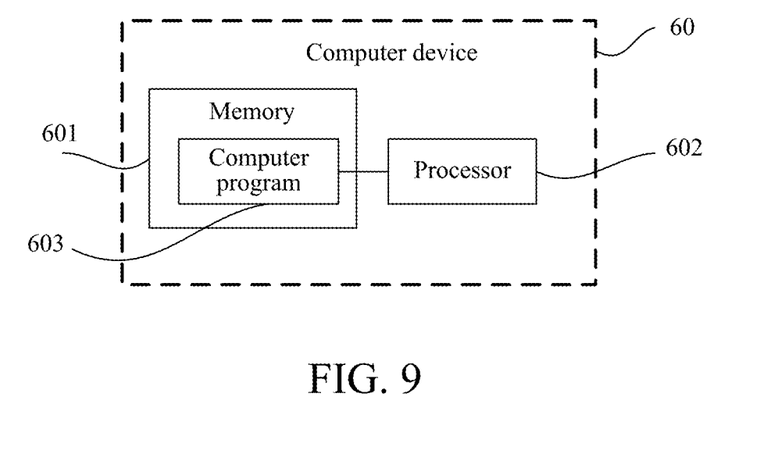
FIG. 9 is a schematic structural diagram of a computer device according to an embodiment of the present disclosure.

FIG. 9 is a schematic structural diagram of a computer device according to an embodiment of the present disclosure.

As shown in FIG. 9, the computer device 60 includes: a memory 601, a processor 602, and a computer program 603 stored on the memory 601 and executable on the processor 602, when the processor 602 executes the computer program 603, the switching control method for the computer interlocking system according to the foregoing embodiment being implemented.

In order to implement the foregoing embodiments, this application further provides a non-transitory computer readable storage medium storing a computer program, the program, when executed by a processor, implementing the switching control method for the computer interlocking system according to the foregoing embodiment.

In description of the present disclosure, description of reference terms such as "one embodiment", "some embodiments", "example", "specific example" or "some examples" means including specific features, structures, materials, or features described in the embodiment or example in at least one embodiment or example of the present disclosure. In this specification, schematic descriptions of the foregoing terms do not necessarily directed at a same embodiment or example. In addition, the described specific features, structures, materials, or features can be combined in a proper manner in any one or more embodiments or examples. In addition, in a case that is not mutually contradictory, a person skilled in the art can combine or group different embodiments or examples that are described in this specification and features of the different embodiments or examples.

In addition, terms "first" and "second" are only used to describe the objective and cannot be understood as indicating or implying relative importance or implying a quantity of the indicated technical features. Therefore, features defining "first" and "second" can explicitly or implicitly include at least one of the features. In the descriptions of the present disclosure, unless explicitly specified, "multiple" means at least two, for example, two or three.

Any process or method description described in a flowchart or in another manner can be understood as a module, segment, or part representing codes including one or more executable instructions for implementing specific logical functions or steps of a process. In addition, a range of preferred implementations of the present disclosure include another implementation, and functions can be executed not according to the shown or discussed sequence, including according to a basically simultaneous manner according to involved functions or an opposite sequence, which should be understood by a person skilled in the art of the embodiments of the present disclosure.

The logic and/or steps shown in the flowcharts or described in any other manner herein, for example, a sequenced list that may be considered as executable instructions used for implementing logical functions, may be specifically implemented in any computer readable medium to be used by an instruction execution system, apparatus, or device (for example, a computer-based system, a system including a processor, or another system that can obtain an instruction from the instruction execution system, apparatus, or device and execute the instruction) or to be used by combining such instruction execution systems, apparatuses, or devices. In the specification of this application, the "computer readable medium" may be any apparatus that can include, store, communicate, propagate, or transmit programs to be used by the instruction execution system, apparatus or device or to be used in combination with the instruction execution system, apparatus or device. More specific examples (a nonexhaustive list) of the computer-readable medium include the following: an electrical connection (electronic apparatus) having one or more wires, a portable computer diskette (magnetic apparatus), a random access memory (RAM), a read-only memory (ROM), an erasable programmable read-only memory (EPROM or flash memory), an optical fiber apparatus, and a portable compact disk read-only memory (CDROM). In addition, the computer readable medium may even be a piece of paper for printing the program, or another proper medium, because, for example, optical scanning may be performed on the paper or another medium, and then processing is performed by performing editing and decryption, or in another proper manner to obtain the program in an electronic manner. Then the program is stored in a computer memory.

It should be understood that parts of the present disclosure may be implemented by using hardware, software, firmware, or combinations thereof. In the foregoing implementations, a plurality of steps or methods may be implemented by using software or firmware that are stored in a memory and are executed by a proper instruction execution system. For example, if hardware is used for implementation, same as in another implementation, implementation may be performed by any one of the following technologies well known in the art or a combination thereof: a discrete logic circuit including a logic gate circuit for implementing a logic function of a data signal, a dedicated integrated circuit including a proper combined logic gate circuit, a programmable gate array (PGA), a field programmable gate array (FPGA), and the like.

A person of ordinary skill in the art may understand that all or some of the steps of the method embodiments may be implemented by a program instructing relevant hardware. The program may be stored in a computer-readable storage medium. When the program is run, one or a combination of the steps of the method embodiments are performed.

What is claimed is:

1. A computer interlocking system, comprising:
a first sub-system and a second sub-system that are mutually redundant and that have a same structure and function, wherein:
the first sub-system and the second sub-system form a double 2-vote-2 architecture, respectively comprising a main control layer, a network layer, and a communication and execution layer;
the network layer is configured to construct a communication network of a sub-system in which the network layer is located;
the main control layer and the communication and execution layer in the first sub-system are respectively connected to a communication network of the first sub-system; and
the main control layer and the communication and execution layer in the second sub-system are respectively connected to a communication network of the second sub-system,
wherein:
the computer interlocking system further includes a first interlocking module respectively connected to the first sub-system and the second sub-system;
the communication and execution layer in the first sub-system includes a first CPU and a second CPU and is configured to:
determine first sub-data acquired by the first CPU and second sub-data acquired by the second CPU;
perform 2-out-of-2 comparison on the first sub-data and the second sub-data, to determine whether the communication and execution layer in the first sub-system meets an active/standby switching condition, and
acquire, through a communication interface connected to a communication and execution layer in a second sub-system, second data determined by the communication and execution layer in the second sub-system; and the first interlocking module is configured to
control, when it is determined that the first sub-data is consistent with the second sub-data and the second data is fault processing data, the communication and execution layer in the first sub-system to be switched to be active; or
control, when it is determined that the first sub-data is inconsistent with the second sub-data and the second data is non-fault processing data, the communication and execution layer in the first sub-system to be switched to be standby.

2. The system according to claim 1, wherein:
the network layer in the first sub-system and/or the network layer in the second sub-system are further configured to construct a monitoring network; and
the main control layer and the communication and execution layer are further connected to the monitoring network, respectively.

3. The system according to claim 1, wherein:
the first sub-system and the second sub-system further respectively comprise: N communication controllers, N being a positive integer; and
the N communication controllers are respectively connected to the communication network of the first sub-system, the communication network of the second sub-system, and the communication and execution layer.

4. The system according to claim 3, wherein:
the number N of the communication controllers in the first sub-system is a positive integer greater than 1; and
the N communication controllers are disposed in different positions.

5. The system according to claim 1, wherein:
the first interlocking module respectively connected to a communication controller in the first sub-system and a communication controller in the second sub-system;
the first interlocking module is configured to determine an active/standby relationship between the communication controller in the first sub-system and the communication controller in the second sub-system according to an acquired instruction of the communication controller in the first sub-system or an acquired instruction of the communication controller in the second sub-system.

6. The system according to claim 5, wherein the first interlocking module comprises a first relay and a second relay connected to each other in an interlocking manner.

7. The system according to claim 1, wherein the main control layer and the communication and execution layer in the first sub-system are respectively in communication connection to the main control layer and the communication and execution layer in the second sub-system.

8. The system according to claim 1, further comprising:
second interlocking modules disposed between the main control layer and the communication and execution layer in the first sub-system and the main control layer and the communication and execution layer in the second sub-system, respectively.

9. The system according to claim 1, wherein:
the first CPU in the first sub-system is in communication connection to a first CPU in the second sub-system; and
the second CPU in the first sub-system is in communication connection to a second CPU in the second sub-system.

10. A switching control method for a computer interlocking system having a first sub-system and a second sub-system that are mutually redundant and that have a same structure and function, wherein the first sub-system and the second sub-system form a double 2-vote-2 architecture, respectively comprising a main control layer, a network layer, and a communication and execution layer, the method comprising:
determining, by the communication and execution layer in the first sub-system, first sub-data acquired by a first CPU and second sub-data acquired by a second CPU;
performing, by the communication and execution layer in the first sub-system, 2-out-of-2 comparison on the first sub-data and the second sub-data, to determine whether the communication and execution layer in the first sub-system meets an active/standby switching condition; and controlling, when it is determined that the communication and execution layer in the first sub-system meets the active/standby switching condition, the communication and execution layer in the first sub-system to perform an active/standby switching operation, wherein the method further comprises:

acquiring, by the communication and execution layer in the first sub-system through a communication interface connected to a communication and execution layer in a second sub-system, second data determined by the communication and execution layer in the second sub-system, wherein the controlling, when it is determined that the communication and execution layer in the first sub-system meets the active/standby switching condition, the communication and execution layer in the first sub-system to perform an active/standby switching operation comprises:

controlling, when it is determined that the first sub-data is consistent with the second sub-data and the second data is fault processing data, the communication and execution layer in the first sub-system to be switched to be active; or controlling, when it is determined that the first sub-data is inconsistent with the second sub-data and the second data is non-fault processing data, the communication and execution layer in the first sub-system to be switched to be standby.

11. The method according to claim 10, wherein after the determining first sub-data acquired by a first CPU and second sub-data acquired by a second CPU, the method further comprises:

determining current first data of the communication and execution layer in the first sub-system according to the first sub-data and the second sub-data; and determining, by the communication and execution layer in the first sub-system, a current data processing mode according to consistency of the first data and the second data.

12. The method according to claim 11, wherein the determining, by the communication and execution layer in the first sub-system, a current data processing mode according to consistency of the first data and the second data comprises:

outputting, by the communication and execution layer in the first sub-system, the first data when the first data is consistent with the second data; and updating the first data according to a current relationship between the active system and the standby system when the first data is inconsistent with the second data.

13. The method according to claim 12, wherein the updating the first data according to a current relationship between the active system and the standby system comprises:

controlling, when the first sub-system is the active system, the communication and execution layer in the second sub-system to update the second data according to the first data; and updating the first data according to the second data when the second sub-system is the active system.

14. The method according to claim 11, wherein the determining current first data of the communication and execution layer in the first sub-system according to the first sub-data and the second sub-data comprises:

determining, when it is determined that the first sub-data is consistent with the second sub-data, that the first sub-data is the first data; and determining the first data according to preset fault processing logic when it is determined that the first sub-data is inconsistent with the second sub-data.

15. The method according to claim 14, wherein the determining the first data according to preset fault processing logic comprises:

determining target fault processing logic according to a transmission direction of the first sub-data or a corresponding signal device type; and determining the first data according to the target fault processing logic.

16. The method according to claim 10, wherein the first sub-system is the standby system, and the method further comprises:

performing, by the communication and execution layer in the first sub-system according to a preset cycle, data synchronization according to data acquired from the communication and execution layer in the second sub-system; and controlling, when it is determined that the data synchronization fails, the communication and execution layer in the first sub-system to stop outputting data.

* * * * *